June 14, 1960

T. L. HIBBARD 2,940,555

WHEEL STRUCTURE

Filed Dec. 7, 1953

INVENTOR.
THOMAS L. HIBBARD
BY
ATTORNEYS

June 14, 1960

T. L. HIBBARD 2,940,555

WHEEL STRUCTURE

Filed Dec. 7, 1953

INVENTOR.
THOMAS L. HIBBARD
BY
ATTORNEYS

United States Patent Office 2,940,555
Patented June 14, 1960

2,940,555
WHEEL STRUCTURE

Thomas L. Hibbard, Birmingham, Mich., assignor to Kelsey-Hayes Company, a corporation of Delaware Filed Dec. 7, 1953, Ser. No. 396,475

7 Claims. (Cl. 188—264)

The invention relates to wheel structures and refers more particularly to motor vehicle wheel structures.

The invention has for one of its objects to provide an improved wheel structure for ventilating a brake structure associated with the wheel structure.

The invention has for another object to provide a wheel structure having a cover member constructed to create flow of air through the wheel structure while it is rotating.

The invention has for a further object to provide an improved cover structure for effecting the flow of air.

These and other objects of the invention will become apparent from the following description taken in connection with the accompanying drawings in which.

Figure 1:
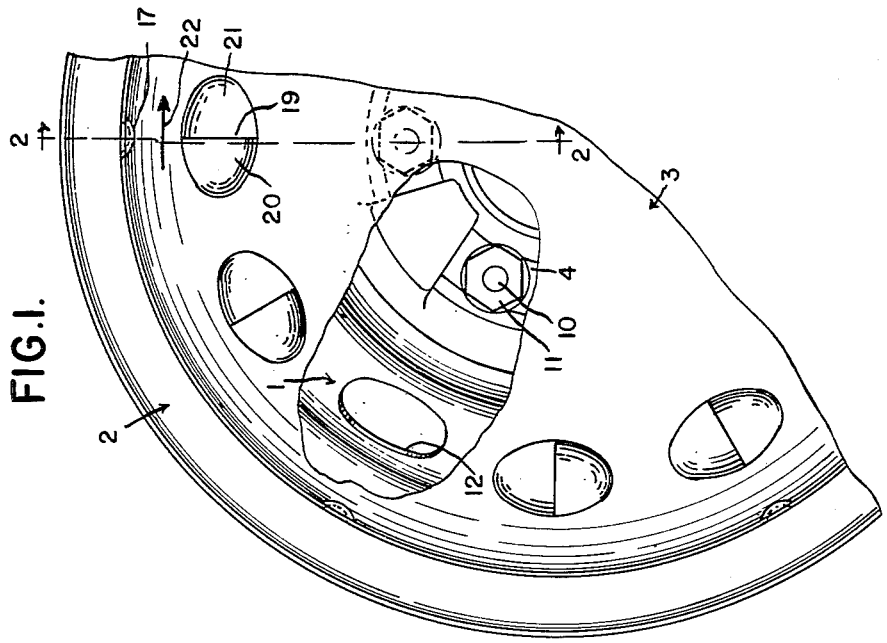
Figure 1 is an outboard elevation partly broken away of a wheel structure embodying the invention.
Figure 2:
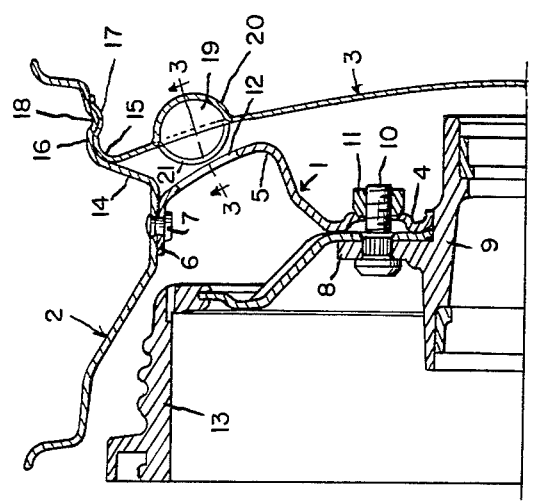
Figure 2 is a cross section on the line 2—2 of Figure 1.
Figure 3:
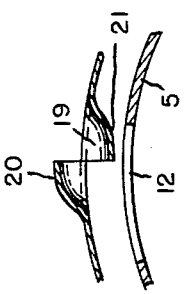
Figure 3 is a cross section on the line 3—3 of Figure 2.

The wheel structure illustrated in Figures 1, 2 and 3 is a motor vehicle wheel structure having the wheel body 1, the tire rim 2 and the circular cover 3. The wheel body is a wheel disk having the mounting or bolting-on portion 4, the web portion 5 and the peripheral flange 6 to which the tire rim 2 is secured by suitable means, such as the rivets 7. The mounting or bolting-on portion 4 is adapted to be detachably secured to the fixed radial flange 8 of the wheel hub 9 by suitable means, such as the bolts 10 and nuts 11. The web portion 5 is formed with the annular series of holes 12. 13 is the brake drum at the inboard side of the wheel disk and permanently secured to the fixed radial flange 8. The cover 3 is located at the outboard side of the wheel structure and is a sheet metal disk extending over the wheel disk and the outboard side wall 14 of the well of the tire rim and terminating in the peripheral flange 15 fitting against the radially inner side of the outboard tire bead seat portion 16 of the tire rim. This peripheral flange is provided with the peripherally spaced bosses 17 resiliently engaging the radially inwardly extending humps 18 of the outboard bead seat portion to retain the cover.

For the purpose of ventilating the brake drum, the cover is provided with the openings 19 and the louvers 20 and 21 at its outboard and inboard sides. These louvers are arranged in pairs and form a passage through the openings for air. The outboard louver 20 of each pair opens or faces peripherally in the direction of the arrow 22 in Figure 1 and picks up air and creates pressure in the air passage and the inboard louver 21 of each pair opens or faces peripherally in the opposite direction and creates vacuum or an ejection effect while the cover is rotating with the wheel in the direction shown by the arrow during the forward movement of the motor vehicle. The louvers are preferably formed by striking the same out of the disk portion of the cover and are substantially semi-elliptical in elevation. The cover is located by the bosses 17 and humps 18 to position the air passages formed by the outboard and inboard louvers of each pair with respect to the holes 12 in the wheel disk so that the latter are in the line of flow of the air passing through the passages. This air in turn flows over the brake drum and serves to ventilate the latter.

Figure 4:
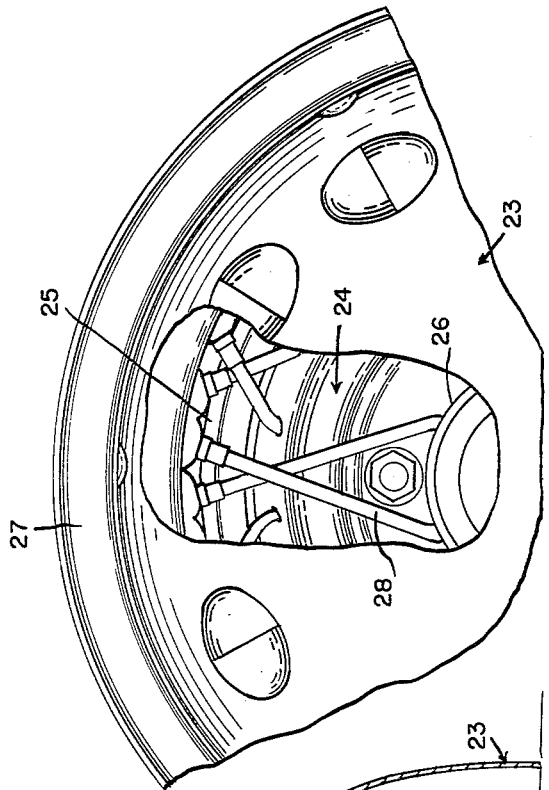
Figures 4 and 5 are views similar to Figures 1 and 2, respectively, showing a modified structure.
Figure 5:
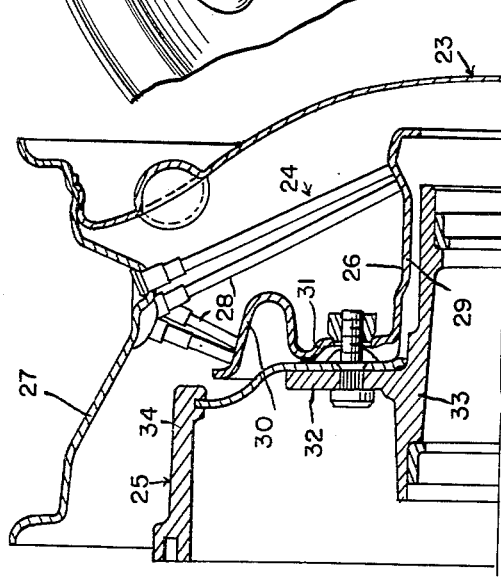

As shown in Figures 4 and 5, the cover 23 is located at the outboard side of the wire wheel 24 and creates flow of air in an inboard direction through the wire wheel and over the brake drum 25. The cover 23 is formed in the same manner as the cover 3 and the wire wheel comprises the hub shell 26, the tire rim 27 and the wire spokes 28 connected to the barrel 29 and annular flange 30 of the hub shell and the base of the well of the rim. The flange 30 is formed with the bolting-on portion 31 adapted to be detachably secured to the fixed radial flange 32 of the wheel hub 33. The brake drum 25 is also adapted to be secured to the fixed radial flange and has its brake flange 34 radially beyond the annular flange 30 and radially inside the rim, so that the air being forced around the spokes and between the annular flange and rim flows over the brake flange to cool the same.

What I claim as my invention is:

1. In a vehicle wheel structure, a wheel body disk having an annular series of holes therethrough and a cover at the outboard side of the wheel structure, said cover having an annular series of circumferentially spaced undivided apertures therethrough, said cover having a pair of louvers associated with each aperture, the louvers of each pair being located at opposite sides of said cover, the louvers of each pair opening toward one another in opposite directions circumferentially of said cover and overlying different portions of the aperture associated therewith, the louvers of each pair cooperating with the associated aperture to form a single undivided air passage through said cover, the louvers at one side of said cover opening in one direction circumferentially of said cover to create pressure and the louvers at the other side of said cover opening in the opposite direction circumferentially of said cover to create vacuum while the wheel structure is rotating to produce a flow of air through said passages, said cover being positioned relative to said disk to locate the holes of said disk substantially in the line of flow of air through said passages.

2. Structure as in claim 1 in which said passages are substantially axially aligned with said holes.

3. Structure as in claim 2 in which the louvers of each pair fully overlie different halves of the aperture associated therewith.

4. In a wheel structure, the combination with a wheel body having air passages therethrough, of a cover at the outboard side of the wheel structure having an annular series of circumferentially spaced undivided apertures therethrough, said cover having a pair of louvers associated with each aperture, the louvers of each pair being located at opposite sides of said cover, the louvers of each pair opening toward one another in opposite directions circumferentially of said cover and overlying different portions of the aperture associated therewith, the louvers of each pair cooperating with the associated aperture to form a single undivided air passage through said cover, the louvers at one side of said cover creating pressure and the louvers at the other side of said cover creating vacuum while the wheel structure is rotating to produce a flow of air through said second-mentioned passages and first-mentioned passages.

5. In a cover structure for a wheel having tire rim and body parts, a circular cover adapted to be located at the outboard side of the wheel and to be secured to one of said parts, said cover having an annular series of circumferentially spaced undivided apertures therethrough, said cover having a pair of louvers associated with each aperture, the louvers of each pair being located at opposite sides of said cover, the louvers of each pair opening toward one another in opposite directions circumferentially of said cover and overlying different portions of the aperture associated therewith, the louvers of each pair cooperating with the associated aperture to form a single undivided air passage through said cover, the louvers at one side of said cover creating pressure and the louvers at the other side of said cover creating vacuum while said cover is rotating to produce a flow of air through said passages.

6. Structure as in claim 5 in which the louvers of each pair fully overlie different halves of the aperture associated therewith.

7. Structure as in claim 4 in which said wheel structure comprises a hub shell, a rim radially spaced from said hub shell, and wire spokes connected to said hub shell and rim, said wire spokes constituting said wheel body and spaced from one another to cooperate with said hub shell and rim in defining said first-mentioned air passages.

References Cited in the file of this patent

UNITED STATES PATENTS

| | | |
|---|---|---|
| 1,159,502 | King et al. | Nov. 9, 1915 |
| 1,665,437 | Booth | Apr. 10, 1928 |
| 1,958,484 | Lyon | May 15, 1934 |
| 2,143,950 | Kliesrath | Jan. 17, 1939 |
| 2,754,939 | Hibbard | July 17, 1956 |
| 2,847,096 | Lyon | Aug. 12, 1958 |